US012779537B2

(12) United States Patent
Shinzawa et al.

(10) Patent No.: US 12,779,537 B2
(45) Date of Patent: Nov. 3, 2026

(54) LAMINATED BODY MOLDING METHOD AND LAMINATED BODY MOLDING APPARATUS

(71) Applicants: MITSUBISHI HEAVY INDUSTRIES ENGINE & TURBOCHARGER, LTD., Sagamihara (JP); TOHOKU UNIVERSITY, Sendai (JP)

(72) Inventors: Keisuke Shinzawa, Kanagawa (JP); Atsushi Takita, Kanagawa (JP); Akihiko Chiba, Miyagi (JP)

(73) Assignees: TOHOKU UNIVERSITY, Sendai (JP); MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 639 days.

(21) Appl. No.: 17/612,963

(22) PCT Filed: May 23, 2019

(86) PCT No.: PCT/JP2019/020549
§ 371 (c)(1),
(2) Date: Nov. 19, 2021

(87) PCT Pub. No.: WO2020/235107
PCT Pub. Date: Nov. 26, 2020

(65) Prior Publication Data
US 2022/0226900 A1 Jul. 21, 2022

(51) Int. Cl.
*B22F 10/28* (2021.01)
*B22F 12/00* (2021.01)
(Continued)

(52) U.S. Cl.
CPC ............ *B22F 10/28* (2021.01); *B22F 12/222* (2021.01); *B22F 12/30* (2021.01); *B22F 12/41* (2021.01);
(Continued)

(58) Field of Classification Search
CPC .......... B22F 10/28; B22F 10/30; B22F 10/37; B22F 12/222; B22F 12/30; B22F 12/41;
(Continued)

(56) References Cited

U.S. PATENT DOCUMENTS

2019/0099914 A1 4/2019 Kitani et al.

FOREIGN PATENT DOCUMENTS

JP 2009-27013 A 11/2009
JP 2019-64226 A 4/2019

OTHER PUBLICATIONS

The Influence of Spreading Metal Powders with Different Particle Size Distributions on the Powder Bed Density in Laser-Based Powder Bed Fusion Processes, by Jacob et al. (Year: 2018).*
(Continued)

*Primary Examiner* — Moshe Wilensky
(74) *Attorney, Agent, or Firm* — Birch, Stewart, Kolasch & Birch, LLP

(57) ABSTRACT

Provided is a laminated body molding method for molding a laminated body by irradiating powder fed onto a stage with a beam and thereby fusing and solidifying the powder or sintering the powder. The laminated body molding method includes: a moving distance setting step S22 of setting a moving distance of the stage to a length that is a certain proportion of a particle diameter of the powder; and a molding step S24 of molding the laminated body by repeating a process of moving the stage downward by the moving distance, feeding the powder onto the stage thus moved, and irradiating the fed powder with the beam to fuse and solidify
(Continued)

the powder or sinter the powder. With this laminated body molding method, impairment of capabilities of the laminated body can be prevented.

4 Claims, 7 Drawing Sheets

(51) Int. Cl.
*B22F 12/30* (2021.01)
*B22F 12/41* (2021.01)
*B22F 12/50* (2021.01)
*B33Y 10/00* (2015.01)
*B33Y 30/00* (2015.01)

(52) U.S. Cl.
CPC .............. *B22F 12/50* (2021.01); *B33Y 10/00* (2014.12); *B33Y 30/00* (2014.12)

(58) Field of Classification Search
CPC .......... B22F 12/50; B22F 12/90; B22F 1/052; B22F 2999/00; B33Y 10/00; B33Y 30/00; B33Y 50/02; C22C 1/0416; C22C 1/0458
See application file for complete search history.

(56) References Cited

OTHER PUBLICATIONS

International Search Report and Written Opinion of the International Searching Authority for International Application No. PCT/JP2019/020549, dated Aug. 27, 2019, with English translation.

* cited by examiner

COMPARABLE EXAMPLE

EXAMPLE

LAMINATED BODY MOLDING METHOD AND LAMINATED BODY MOLDING APPARATUS

FIELD

The present invention relates to a laminated body molding method and a laminated body molding apparatus.

BACKGROUND

In recent years, a laminated body molding method for molding a three-dimensional laminated body out of a raw material that is powder, such as metal powder, has been put into practical application. For example, Patent Literature 1 discloses a laminated body molding method by use of the powder bed fusion technique in which: a process of feeding metal powder into a powder feeding chamber, irradiating a specific portion of the metal powder with a laser beam to fuse and solidify the specific portion, and thereafter moving the powder feeding chamber downward is performed; and the same process as this is repeated.

CITATION LIST

Patent Literature

Patent Literature 1: Japanese Patent Application Laid-open No. 2009-270130

SUMMARY

Technical Problem

In molding a laminated body by use of the powder bed fusion technique, molding conditions have substantial impacts on capabilities, such as the strength, of the laminated body. Therefore, it is needed to set molding conditions to those that can prevent impairment of capabilities of the laminated body.

The present invention has been made to solve the above-described problem, and an object of the present invention is to provide a laminated body molding method and a laminated body molding apparatus that can each prevent impairment of capabilities of a laminated body.

Solution to Problem

In order to solve the above-described problem and achieve the object, a laminated body molding method according to the present disclosure is for molding a laminated body by irradiating powder fed onto a stage with a beam and fusing and solidifying the powder or sintering the powder. The laminated body molding method includes: a moving distance setting step of setting a moving distance of the stage to a length that is a certain proportion of a particle diameter of the powder; and a molding step of molding the laminated body by repeating a process of moving the stage downward by the moving distance, feeding the powder onto the stage thus moved, and irradiating the fed powder with the beam to fuse and solidify the powder or sinter the powder.

With this laminated body molding method, the moving distance is set based on the particle diameter of a particle, whereby impairment of capabilities of the laminated body can be prevented.

The laminated body molding method further includes a proportion acquiring step of acquiring information on a proportion of a volume of a solidified body to an apparent volume of powder fed onto the stage, the solidified body being solidified as a result of irradiating the powder with the beam, wherein the moving distance can be set based on the proportion at the moving distance setting step. With this laminated body molding method, impairment of capabilities of the laminated body can be prevented.

At the moving distance setting step, the moving distance is previously set to a length that is not less than 50% and not more than 100% of a maximum particle diameter of the powder. With this laminated body molding method, impairment of capabilities of the laminated body can be prevented.

in order to solve the above-described problem and achieve the object, a laminated body molding method according to the present disclosure is for molding a laminated body by irradiating powder fed onto a stage with a beam and fusing and solidifying the powder or sintering the powder. The laminated body molding method includes: a powder preparing step of preparing the powder that has a particle diameter that is a certain proportion of a moving distance of the stage; and a molding step of molding the laminated body by repeating a process of moving the stage downward by the moving distance, feeding the powder onto the stage thus moved, and irradiating the fed powder with the beam to fuse and solidify the powder or sinter the powder. With this laminated body molding method, the laminated body is molded using the powder that has a particle diameter that is the certain proportion of the moving distance, whereby impairment of capabilities of the laminated body can be prevented.

The laminated body molding method preferably further includes a proportion acquiring step of acquiring information on a proportion of a volume of a solidified body to an apparent volume of powder fed onto the stage, the solidified body being solidified as a result of irradiating the powder with the beam, wherein the powder is prepared based on the proportion at the powder preparing step. With this laminated body molding method, impairment of capabilities of the laminated body can be prevented.

The powder that has a maximum particle diameter not less than one time and not more than twice the moving distance is preferably prepared at the powder preparing step. With this laminated body molding method, impairment of capabilities of the laminated body can be prevented.

in order to solve the above-described problem and achieve the object, a laminated body molding apparatus according to the present disclosure is configured to mold a laminated body by irradiating powder fed onto a stage with a beam and fusing and solidifying the powder or sintering the powder. The laminated body molding apparatus includes: a moving distance setting unit configured to set a moving distance of the stage to a length that is a certain proportion of a particle diameter of the powder; and a molding unit configured to mold the laminated body by repeating a process of moving the stage downward by the moving distance, feeding the powder onto the stage thus moved, and irradiating the fed powder with the beam to fuse and solidify the powder or sinter the powder. With this laminated body molding apparatus, the moving distance is set based on the particle diameter of a particle, whereby impairment of capabilities of the laminated body can be prevented.

In order to solve the above-described problem and achieve the object, a laminated body molding apparatus according to the present disclosure is configured to mold a laminated body by irradiating powder fed onto a stage with a beam and fusing and solidifying the powder or sintering the powder. The laminated body molding apparatus includes: a powder preparing unit configured to prepare the powder that has a particle diameter that is a certain proportion of a moving distance of the stage; and a molding unit configured to mold the laminated body by repeating a process of moving the stage downward by the moving distance, feeding the powder onto the stage thus moved, and irradiating the fed powder with the beam to fuse and solidify the powder or sinter the powder. With this laminated body molding apparatus, the laminated body is molded using the powder that has a particle diameter that is the certain proportion of the moving distance, whereby impairment of capabilities of the laminated body can be prevented.

Advantageous Effects of Invention

According to the present invention, impairment of capabilities of the laminated body can be prevented.

DESCRIPTION OF EMBODIMENTS

The following describes a preferred embodiment of the present invention in detail with reference to the accompanying drawings. This embodiment is not intended to limit the present invention. When there are a plurality of embodiments, the present invention includes an embodiment obtained by combining any two or more of these embodiments.

Figure 1:
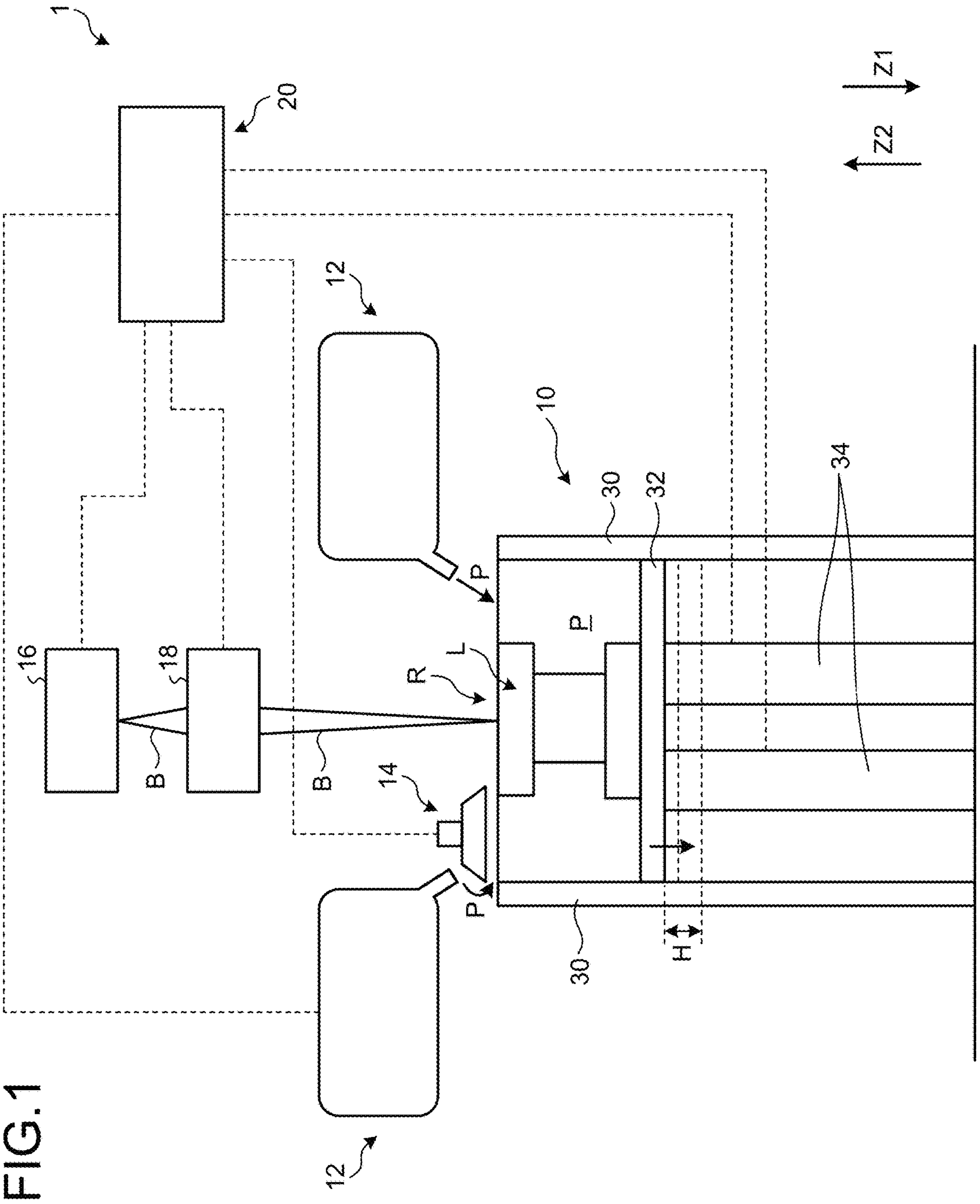
FIG. 1 is a schematic view of a laminated body molding apparatus according to the present embodiment.

FIG. 1 is a schematic view of a laminated body molding apparatus according to the present embodiment. The laminated body molding apparatus 1 according to the present embodiment is an apparatus capable of executing a laminated body molding method according to the present embodiment and is configured to mold a laminated body L, which is a three-dimensionally shaped object, from powder P by use of what is called the powder bed fusion technique. In the present embodiment, the powder P is metal powder and may be made of, for example, a nickel based alloy or a TiAl based alloy. The nickel based alloy herein is an alloy that contains Ni, Cr, Nb, and Mo, which, for example, contains 50.0 to 55.0 wt % of Ni, 17.0 to 21.0 wt % of Cr, 4.75 to 5.50 wt % of Nb, and 2.8 to 3.3 wt % of Mo. This nickel based alloy may contain inevitable impurities. Inconel 718 (registered trademark) may be used as the nickel based alloy. The TiAl based alloy herein is a compound (such as TiAl, $Ti_3Al$, or $Al_3Ti$) which Ti and Al are bonded, that is, a TiAl based intermetallic compound. As the TiAl based alloy, for example, an alloy may be used that contains 40 to 50 at % of Al and 3 to 10 at % of Mn with the remainder being Ti and inevitable impurities. Alternatively, as the TiAl based alloy, for example, an alloy may be used that contains 40 to 50 at % of Al and at least one kind selected from Cr and Nb, which accounts for 3 to 10 at %, with the remainder being Ti and inevitable impurities. Each of the TiAl based alloys of the compositions given above as examples may further contain at least one of the following: 1 to 2.5 at % of Nb; at least one kind selected from Mo, W, and Zr, which accounts for 0.2 to 1.0 at %; 0.1 to 0.4 at % of C; and at least one kind selected from. Si, Ni, and Ta, which accounts for 0.2 to 1.0 at %. The laminated body L is molded from the powder P and therefore is formed into a metal body that has the same composition as the powder P. However, the powder P and the laminated body L may be of any desired compositions.

As illustrated in FIG. 1, the laminated body molding apparatus 1 includes a molding chamber 10, a powder feeding unit 12, a blade 14, a radiation source unit 16, a radiation unit 18, and a controller 20. Controlled by the controller 20, the laminated body molding apparatus 1 feeds the powder P from the powder feeding unit 12 into the molding chamber 10 and emits a beam from the radiation source unit 16 and the radiation unit 18 to the powder P fed into the molding chamber 10, thereby fusing and solidifying the powder P or sintering the powder P, to mold the laminated body L. Hereinbelow, a direction oriented vertically downward from the upper side is defined as the direction Z1, and a direction opposite to the direction Z1, that is, a direction oriented vertically upward from the lower side is defined as the direction Z2.

The molding chamber 10 includes a housing 30, a stage 32, and a moving mechanism 34. The housing 30 is a housing with an open upper side, that is, the side facing the direction Z2. The stage 32 is arranged inside the housing 30 in such a manner as to be surrounded by the housing 30. The stage 32 is configured to be movable inside the housing 30 in the direction Z1 and the direction Z2. A space R surrounded by the upper surface of the stage 32 and the inner circumferential surface of the housing 30 serves as a space into which the powder P is fed. The moving mechanism 34 is joined to the stage 32. Controlled by the controller 20, the moving mechanism 34 moves the stage 32 vertically, that is, in the direction Z1 and the direction Z2.

The powder feeding unit 12 is a mechanism that stores therein the powder P. The powder feeding unit 12 is controlled by the controller 20 for feeding the powder P and feeds the powder P from a feed port 12A into the space P on the stage 32 under the control of the controller 20. The blade 14 is a squeegeeing blade that horizontally squeegees the powder P that has been fed into the space R. The blade 14 is controlled by the controller 20.

The radiation source unit 16 is a radiation source of a beam B. The beam B is a bundle of particles or waves that travel in parallel, which is an electron beam in the present embodiment. In the present embodiment, the radiation source unit 16 is a tungsten filament. However, the beam B is any beam that can sinter or fuse the powder P and is not limited to an electron beam, and the radiation source unit 16 may be any radiation source unit that can emit the beam B. For example, the beam B may be a laser beam.

The radiation unit 18 is provided above the molding chamber 10, that is, on the side facing the direction Z2. The radiation unit 18 is a mechanism that irradiates the molding chamber 10 with the beam B from the radiation source unit 16. The radiation unit 18 includes, for example, optical elements such as an astigmatism lens, a condenser lens, and a deflector lens. The radiation unit 18 further includes, for example, a scanning mechanism that is controlled by the controller 20 so as to be able to scan with the beam B, and emits a beam to a specific portion of the powder P spread all over the stage 32 by emitting the beam B from the radiation source unit 16 to molding chamber 10 while scanning with the beam B. The powder P is fused and solidified (fused and then solidified) or is sintered in a location to which the beam B has been emitted. The controller 20 is described further below.

The laminated body molding apparatus 1 is configured as described above. The laminated body molding apparatus 1 feeds the powder P onto the stage 32 by means of the powder feeding unit 12, and emits the beam B to the powder P on the stage 32 by means of the radiation source unit 16 and the radiation unit 18. The powder P in a location to which the beam B has been emitted is sintered or is fused and solidified, thereby turning into a solidified body A. After molding the solidified body A, the laminated body molding apparatus 1 moves the stage 32 by a moving distance H in the direction Z1 by means of the moving mechanism 34. The laminated body molding apparatus 1 then feeds the powder P onto the stage 32, that is, onto the solidified body A by means of the powder feeding unit 12 and emits the beam B to the powder P on the stage 32 by means of the radiation source unit 16 and the radiation unit 18. As a result, another solidified body A is stacked as a layer on the solidified body A. After the new solidified body A is stacked as a layer, the laminated body molding apparatus 1 moves the stage 32 by the moving distance H in the direction Z1 and repeats the same process. The laminated body molding apparatus 1 repeats this process to stack the solidified bodies A in layers, thereby molding the laminated body L.

Figure 2:
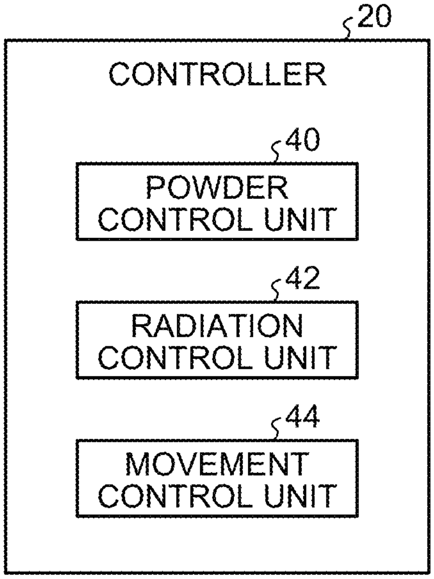
FIG. 2 is a schematic block diagram of a controller 20 according to the present embodiment.

FIG. 2 is a schematic block diagram of the controller 20 according to the present embodiment. The controller 20 is, for example, a computer, and includes: an arithmetic processor formed of a central processing unit (CPU) or the like; and a storage unit. As illustrated in FIG. 2, the controller 20 includes a powder control unit 40, a radiation control unit 42, and a movement control unit 44. The powder control unit 40, the radiation control unit 42, and the movement control unit 44 are implemented by having a computer program read out by the controller 20 from the storage unit and execute processes of the individual units. However, the powder control unit 40, the radiation control unit 42, and the movement control unit 44 may be separate individual pieces of hardware.

The powder control unit 40 controls feeding of the powder P onto the stage 32. The powder control unit 40, for example, controls the powder feeding unit 12 to feed the powder P onto the stage 32 that has been moved downward by the moving distance H. The powder control unit 40 then controls the blade 14 to cause the blade 14 to squeegee the powder P on the stage 32.

The radiation control unit 42 controls radiation of the beam B to the powder P on the stage 32. The radiation control unit 42, for example, reads out three-dimension data stored in the storage unit, sets a scanning path of the beam B based on the three-dimension data, and controls the radiation unit 18 to emit the beam B along the set scanning path.

The movement control unit 44 controls the moving mechanism 34 to move the stage 32. After the solidified body A is formed with the beam B emitted to the powder P, the movement control unit 44 moves the stage 32 by the moving distance H in the direction Z1. Optionally, the movement control unit 44 may set a length of the moving distance H. The manner in which the moving distance H is set is described further below.

Thus, each time after moving the stage 32 downward by the moving distance H, the laminated body molding apparatus 1 spreads the powder P all over the stage 32 and emits the beam B thereto, thereby stacking the solidified bodies A in layers one by one to produce the laminated body L. Next, a process of molding layers of the solidified bodies A one by one is described.

Figure 3:
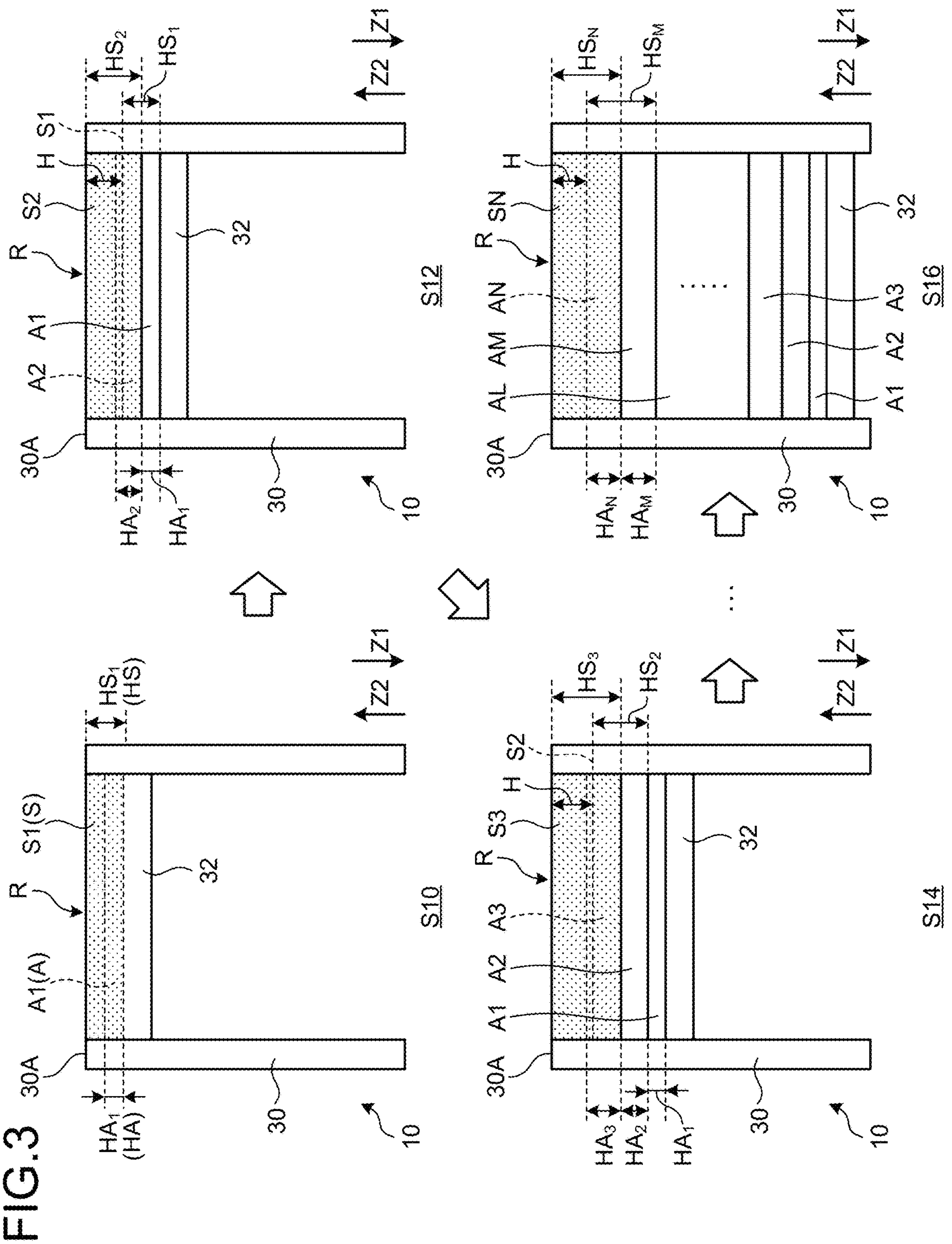
FIG. 3 is a set of schematic views explaining a procedure for molding layers of solidified bodies one by one.

FIG. 3 is a set of schematic views explaining a procedure for molding layers of the solidified bodies one by one. Step S10 in FIG. 3 indicates a state in which the first layer is being stacked. The powder P is fed into the space R on the upper side of the stage 32. The powder P is squeegeed by the blade 14, whereby the space R is filled up with the powder P in such a manner that the upper side thereof is leveled flush with an upper end part 30A of the housing 30. Hereinbelow, each layer of the powder P with which the space R has been filled up is referred to as a powder layer S. The powder layer S is a layer with which the space R has been filled up but contains voids because the powder layer S is formed with the powder P. Hereinbelow, the length of the space R in the direction Z1, that is, the height thereof, is referred to as a height HS. The space R is filled up with the powder layer S, and the height HS can therefore be understood also as the height of the powder layer S.

As indicated by step S10 in FIG. 3, the height HS of the space R when the first layer is stacked is found to be a height $HS_1$, and the space R is filled up with a powder layer S1, which is the first layer. Here, the height $HS_1$ of the first layer may equal to the moving distance H. The beam B is emitted to the powder layer S1, whereby a solidified body A1 is formed. When the beam B is emitted to the powder layer S, the powder layer S is fused or sintered, whereby the apparent volume thereof is reduced because voids therein disappear. The apparent volume, which is the volume of the powder layer S that includes voids therein, means the entire volume of the powder layer S that includes the powder P and the voids. Therefore, the volume of the solidified body A is smaller than the apparent volume of the powder layer S, and the length, that is, a height HA, of the solidified body A in the direction Z1 is smaller than the height. HS of the powder layer S. At step S10, the solidified body A1 having a height $HA_1$ is formed from the powder layer S1 having the height $HS_1$. In the present embodiment, the proportion of the height HA of the solidified body A to the height HS of the powder layer S is about 50%. In other words, the volume of the solidified body A is about 50% of the apparent volume of the powder layer S. Therefore, the height $HA_1$ of the solidified body A1 at step S10 is lower than the height $HS_1$ of the powder layer S1 and is about 50% of the height $HS_1$.

Step S12 in FIG. 3 indicates a state in which the second layer is being stacked. After the solidified body A1 is formed at step S10, the laminated body molding apparatus 1 moves the stage 32 by the moving distance H in the direction Z1, and then feeds the powder P into the space R on the upper side of the stage 32, that is, onto the solidified body A1. In this case, the distance between the upper surface of the powder layer S1 stacked as the first layer and the upper end part 30A of the housing 30 is the moving distance H; however, the actual situation here is that the powder layer S1 has been solidified into the solidified body A1. Therefore, a height $HS_2$ of the space R into which the powder P is fed equals to the distance between the upper surface of the solidified body A1 and the upper end part 30A of the housing 30. The height $HS_2$ of the space R is higher than the height $HS_1$ of the space R for the first layer. Specifically, the height $HS_2$ of the space R is obtained by adding the difference between the height $HA_1$ of the solidified body A1 and the height $HS_1$ of the powder layer S1 to the moving distance H by which the stage 32 is moved downward. This space R is then filled up with the second powder layer S2, and it can be understood that the height of the powder layer S2 is also the height $HS_2$. The beam 13 is emitted to the powder layer S2, whereby a solidified body A2 is formed on the solidified body A1. The height of the solidified body A2 formed from the powder layer S2 is a height $HA_2$. The height $HA_2$ of the solidified body A2 is about 50% of the height $HS_2$ of the powder layer S2, thus being higher than the height $HA_1$ of the solidified body A1 for the first layer.

Step S14 in FIG. 3 indicates a state in which the third layer is being stacked. After the solidified body A2 is formed at step S12, the laminated body molding apparatus 1 moves the stage 32 by the moving distance H in the direction Z1, and then feeds the powder P into the space R on the upper side of the stage 32, that is, onto the solidified body A2. A height $HS_3$ of the space R into which the powder P is fed equals to the distance between the upper surface of the solidified body A2 and the upper end part 30A of the housing 30; therefore, the height $HS_3$ is even higher than the height $HS_1$ of the space R for the second layer. Specifically, the height $HS_3$ of the space R is obtained by adding the difference between the height $HA_2$ of the solidified body A2 and the height $HS_2$ of the powder layer S2 to the moving distance H by which the stage 32 is moved downward. The height of the third powder layer S3 with which this space R is filled up is also the height $HS_3$. The beam B is emitted to the powder layer S3, whereby a solidified body A3 is formed on the solidified body A2. The height of the solidified body A3 formed from the powder layer S3 is a height $HA_3$. The height $HA_3$ of the solidified body A3 is about 50% of the height $HS_3$ of the powder layer S3, thus being higher than the height $HA_2$ of the solidified body A2 for the second layer.

Also after step S14, a process of stacking one layer of the solidified body A at a time is repeated. When the stacking has been repeated a certain number of times, the height HS of the space R (powder layer S) and the height HA of the solidified body A converge to certain values. Step S16 indicates a state in which the Nth layer is being stacked, where N is a certain number. As indicated by step S16, when the Nth layer is being stacked, the space R on the upper side of a solidified body AM, which has been formed as a result of stacking the Mth layer immediately preceding the Nth layer, is filled up with a powder layer SN. The beam B is then emitted to the powder layer SN, whereby a solidified body AN is formed on the solidified body AM. The height of the space R at this step, that is, a height $HS_N$ of the powder layer SN, has converged and therefore equals to a height $HS_M$ of a powder layer SM immediately preceding the powder layer SN. Likewise, a height $HA_N$ of the solidified body AN equals to a height $HA_M$ of the solidified body AM. The laminated body molding apparatus 1 in general stacks a large number of layers; therefore, a large part of the laminated body L is formed of the solidified bodies A after the convergence of these heights.

As described above, the solidified body A shrinks to a height that is about 50% of that of the powder layer S. Therefore, the height $HS_N$ of the powder layer SN (space R) in the Nth layer is expressed by Equation (1) below. The term "$HS_{(N-1)}$" in Equation (1) expresses the height of the powder layer S immediately preceding the Nth layer, that is, the height $HS_M$ of the powder layer SM in FIG. 3.

$$HS_N = 0.5 \cdot HS_{(N-1)} + H \tag{1}$$

The height HS of the powder layer S after the convergence thereof is expressed by Equation (2) below because the height $HS_N$ of the powder layer SN is expressed by Equation (1).

$$HS = \lim_{n \to \infty} HS_N = 2H \tag{2}$$

That is, the height HS of the powder layer S after the convergence thereof equals to twice the moving distance H. At the same time, a height ANS of the solidified body AN after the convergence thereof substantially equals to the moving distance H because the height ANS of the solidified body AN equals to about 50% of the height HS of the powder layer S.

The present inventors have focused on a process of stacking layers one by one as described above and discovered a technique that is intended to prevent impairment of capabilities of the laminated body L and that associates the moving distance H of the stage 32 for each layer with particle diameters of the powder P in setting molding conditions. That is, the present inventors discovered that setting the moving distance H to a certain proportion of a particle diameter of the powder P can prevent impairment of capabilities of the laminated body L. This discovery is specifically described below.

Figure 4:
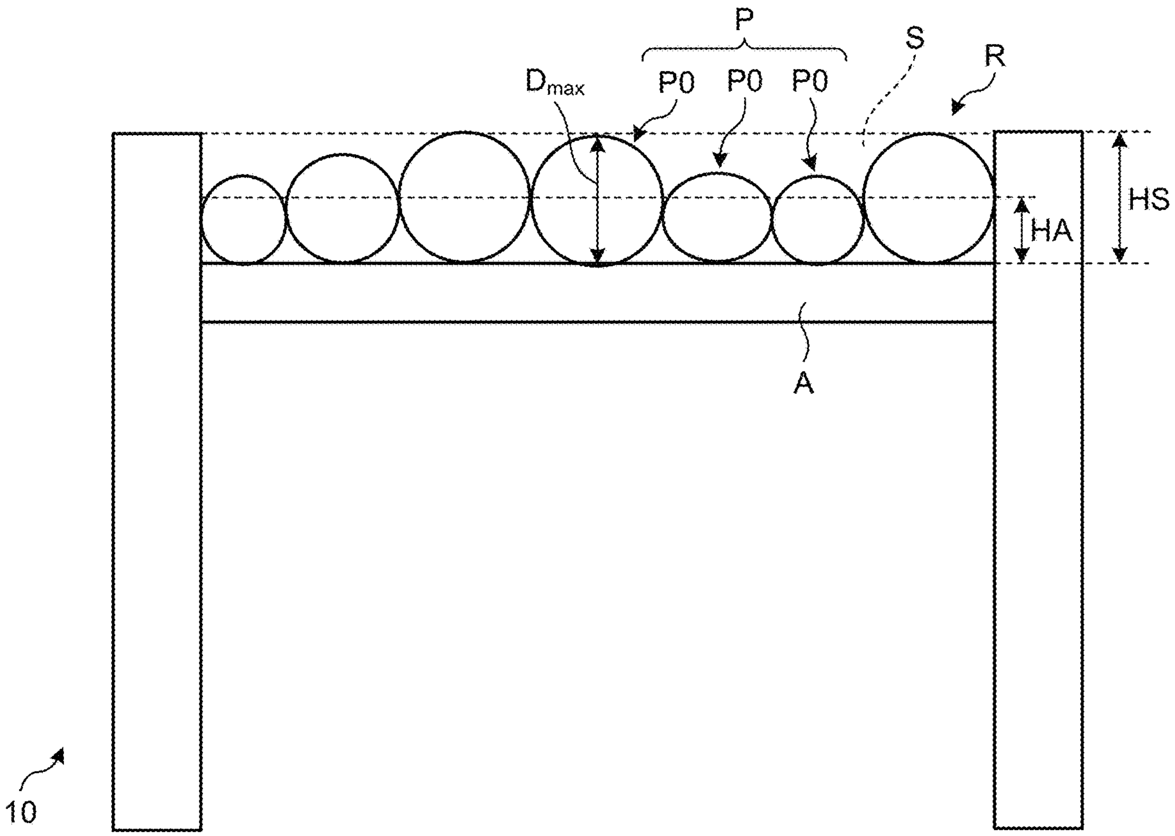
FIG. 4 is a view explaining a state in which powder has been stacked as a layer.

FIG. 4 is a view explaining a state in which a layer of powder has been stacked as a layer. FIG. 4 illustrates a state in which the solidified body A is being formed from the powder layer S made of the powder P. The powder P is an aggregate of a plurality of particles P0 that are, for example, metal particles (powder), the aggregate having the particles P0 congregated therein. In the laminated body molding apparatus 1, the height HS of the space R (powder layer S) is preferably set not less than a maximum particle diameter Dmax of the particles P0 in the powder P, that is, set so that the particle P0 that corresponds to the maximum particle diameter Dmax can be contained in the space P, which has the height HS. In the present embodiment, as expressed by Equation (2), the height HS of the space P (powder layer S) converges to a value that is twice the moving distance H. Therefore, when the value that is twice the moving distance H is not less than the maximum particle diameter Dmax, the height HS can be kept not less than the maximum particle diameter Dmax. In other words, setting the moving distance H not less than 50% of the maximum particle diameter Dmax as expressed by Expression (3) below can result in keeping the maximum particle diameter Dmax not less than the height HS.

$$H \geq 0.5 \cdot D\text{max} \tag{3}$$

Thus setting the moving distance H not less than 50% of the maximum particle diameter Dmax can result in keeping the heights HS in all layers after the conversion not less than 50% of the maximum particle diameter Dmax because the height HS of the space R (powder layer S) converges after the stacking of a layer is repeated a certain number of times.

Setting the moving distance H excessively long makes the thickness of the solidified body A excessively thick and reduces accuracy in shaping. Therefore, the moving distance H is preferably set relatively short. In the present embodiment, the moving distance H is preferably set, for example, not greater than 100% of the maximum particle diameter Dmax. That is, in the present embodiment, the moving distance H is preferably set not less than 50% and not more than 100% of the maximum particle diameter Dmax. However, the present embodiment is not limited to setting the moving distance H not more than 100% thereof because making the moving distance H longer is advantageous in speeding up the shaping. FIG. 4 illustrates an example of a case where the height HS is equal to the maximum particle diameter Dmax, that is, a case where the moving distance H is 50% of the maximum particle diameter Dmax.

As described above, in the present embodiment, the solidified body A shrinks into a height that is 50% of the height of the powder layer S. This can be understood as meaning that the proportion of the height HA of the solidified body A to the height HS of the powder layer S is 0.5. However, a case where the proportion of the height HA of the solidified body A to the height HS of the powder layer S is not 0.5 is possible. In such a case, the moving distance H may be set based on a proportion X that is the proportion or the height HA to the height HS. The height HS of the powder layer SN can be expressed by Equation (4) below using the proportion X. The proportion X is a value smaller than 1. The proportion X of the height HA to the height HS can be understood also as the proportion of the volume of the solidified body A to the apparent volume of the powder layer S.

$$HS_N=(1-X)\cdot HS_{(N-1)}+H \qquad (4)$$

Therefore, the height HS of the powder layer S after the convergence thereof is expressed by Equation (5) below.

$$HS=\lim_{n\to\infty} HS_N = H/X \qquad (5)$$

That is, the height HS of the powder layer S after the convergence thereof equals to a value obtained by dividing the moving distance H by the proportion X. In this case, it can be understood that, when the value obtained by dividing the moving distance H by the proportion X is not less than the maximum particle diameter Dmax, the height HS can be kept not less than the maximum particle diameter Dmax. Therefore, in this case, it can be understood that the moving distance H needs only to be not less than a value obtained by multiplying the maximum particle diameter Dmax by the proportion X as expressed by Expression (6).

$$H\geq X\cdot D\text{max} \qquad (6)$$

In the present embodiment, for example, the proportion X of the height HA to the height HS is about 50% when a nickel based alloy or a TiAl based alloy is used as the powder P. Therefore, for example, when a nickel based alloy or a TiAl based alloy is used for the powder P, the moving distance H is preferably set not less than 50% and not more than 100% of the maximum particle diameter Dmax as described above. However, the moving distance H may be set not less than 50% and not more than 100% of the maximum particle diameter Dmax even when neither a nickel based alloy nor a TiAl based alloy is used as the powder P. Furthermore, with a value of the proportion X of the height HA to the height HS obtained previously, the moving distance H may be set not less than a value obtained by multiplying the maximum particle diameter Dmax by the proportion X and not more than 100% of the maximum particle diameter Dmax. The value of the proportion X may be obtained by any one of the following: actually producing the solidified body A from the powder layer S and measuring the value; calculating the value; and acquiring information previously detected.

Next, effects in a case where the height HS of the space R (powder layer S) is set not less than the maximum particle diameter Dmax, that is, effects in a case where the moving distance H is set not less than a value obtained by multiplying the maximum particle diameter Dmax by the proportion X, are described.

Figure 5:
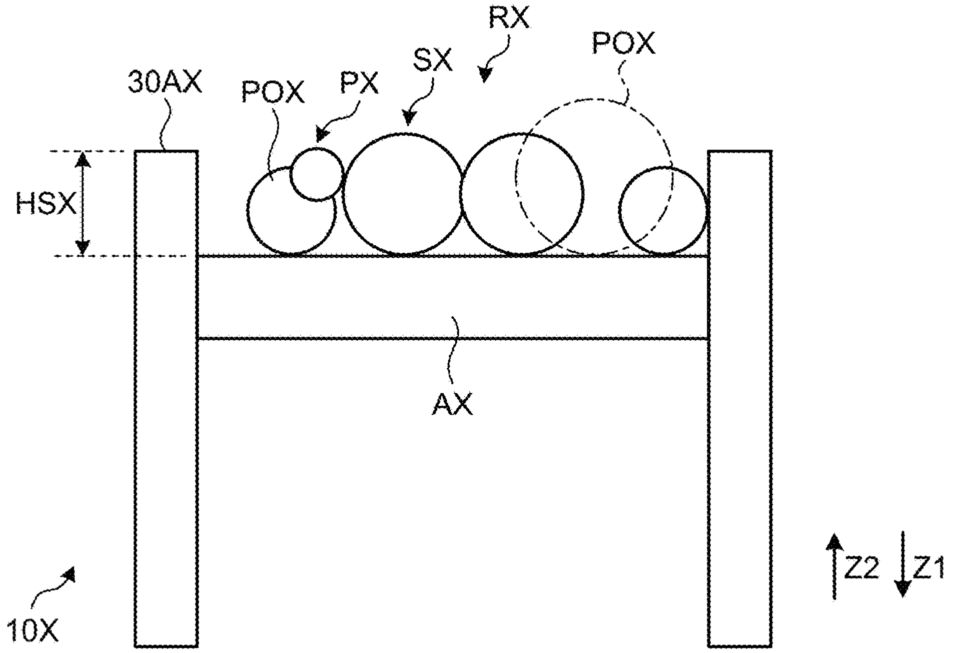
FIG. 5 is a schematic view illustrating stacking a layer according to a comparable example.

FIG. 5 is a schematic view illustrating stacking a layer according to a comparable example. FIG. 5 illustrates an example where, with powder PX fed onto a solidified body AX molded in a molding chamber 10X according to the comparable example, a space on the solidified body AX is filled up with a powder layer SX. In the comparable example, unlike the present embodiment, a moving distance of a stage is not set based on a particle diameter of the powder PX. Therefore, the comparable example may possibly include a particle PDX the particle diameter of which larger than a height HSX of a space RX. In that case, the particle PDX the particle diameter of which is thus large may possibly protrude upward from an upper end part 30AX of the molding chamber 10X and be removed, for example, during squeegeeing. In that case, the powder layer SX could have a gap formed in a location from which the particle P0X has been removed or could be relatively thin in a location from which the particle P0X has been removed. When the beam B is emitted to this gap or a location in which the layer is thus thin, a relatively large quantity of heat is transferred to a part of the solidified body AX under that location, and the temperature of the solidified body AX in that location consequently becomes relatively high, which may possibly lead to a corresponding local decrease in speed at which the fused powder layer SX cools when being solidified. Such a local decrease in cooling speed could result in, for example, formation of crystal phases in a location in which the cooling speed has decreased, the crystal phases being different from those formed in the other locations, possibly leading to impairment of capabilities, such as strength, of a laminated body. For example, when a nickel based alloy is used, Laves phases may possibly be formed in a location in which the cooling speed has locally decreased and result in impairment of capabilities, such as strength, of a laminated body.

Figure 6:
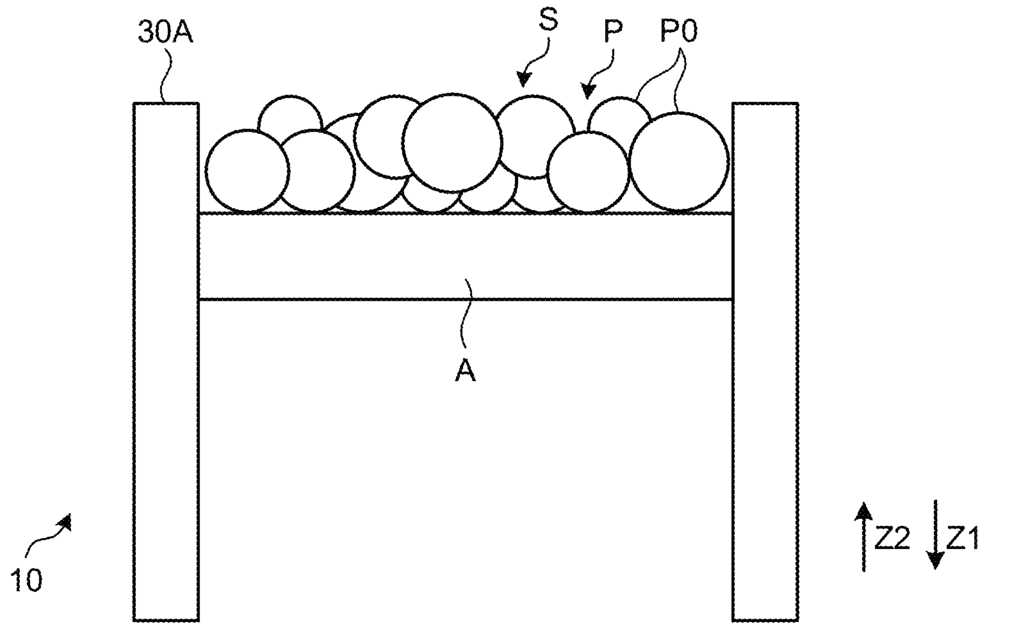
FIG. 6 is a schematic view illustrating stacking a layer according to the present embodiment.

FIG. 6 is a schematic view illustrating stacking a layer according to the present embodiment. FIG. 6 illustrates an example where, with the powder P fed onto the solidified body A according to the present embodiment, a space on the solidified body A molded in the molding chamber 10 is filled up with a powder layer S. The moving distance H of the stage 32 according to the present embodiment is set based on a particle diameter of the powder P. More specifically, the height HS of the space R is not less than the maximum particle diameter Dmax of the powder P because the moving distance H is set not less than a value obtained by multiplying the maximum particle diameter of a particle PX0 by the proportion X. In this case, the particles P0 are prevented from protruding above the upper end part 30A, whereby removal of the particles P0 from the powder layer S is prevented. In the present embodiment, generation of gaps in the powder layer S is thereby prevented, whereby the cooling speed is prevented from locally decreasing. Consequently, in the present embodiment, formation of Laves phases for example is prevented, whereby impairment of capabilities of the laminated body can be prevented. The present embodiment is also not limited to setting the height HS not more than the maximum particle diameter Dmax of the powder P, and may be any embodiment in which the moving distance H is set to a certain proportion of a particle diameter of the powder P. That is, in the present embodiment, setting the moving distance H based on a particle diameter of the powder P can result in not only preventing generation of gaps but also constructing a manufacturing method for preventing impairment of the capabilities.

Figure 7:
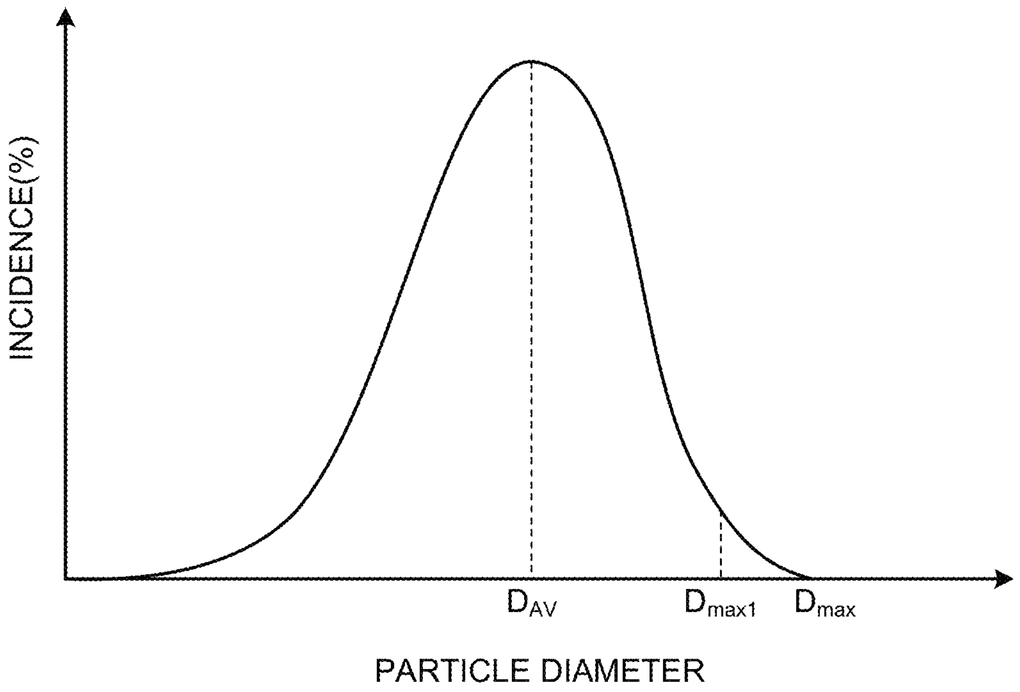
FIG. 7 is a schematic view explaining control according to the present embodiment that is performed when operation is stopped.

While any desired method may be used to measure particle diameters of the powder P in the present embodiment, the particle diameters are obtained, for example, based on a particle size distribution measured using the laser diffraction and scattering method. As the particle size distribution, a volume based distribution may be used or a number based distribution may be used. FIG. 7 is a graph explaining the particle diameters of particles. FIG. 7 is a graph illustrating an example of a particle diameter measurement result. FIG. 7 is an example of the measurement result of particle size distribution of the powder P used for sampling, which was measured using the laser diffraction and scattering method, for example. As illustrated in FIG. 7, the maximum particle diameter Dmax of the powder P means, for example, the particle diameter of the particle P0 that has the largest particle diameter among the particles P0 contained in the powder P that was sampled. However, the maximum particle diameter Dmax is not limited to being the particle diameter of the particle P0 that has the largest particle diameter. For example, a particle diameter Dmax1 of a particle P0 at the top certain percentile, such as the top 0.15th or top 10th percentile, of the particles P0 arranged in descending order of particle diameters may be set as the maximum particle diameter. Alternatively, in the present embodiment, the moving distance H may be set to a certain proportion of an average particle diameter $D_{AV}$ of the powder P, for example. In this case, the average particle diameter $D_{AV}$ is the average value of a particle size distribution obtained by using, for example, the laser diffraction and scattering method.

Figure 8:
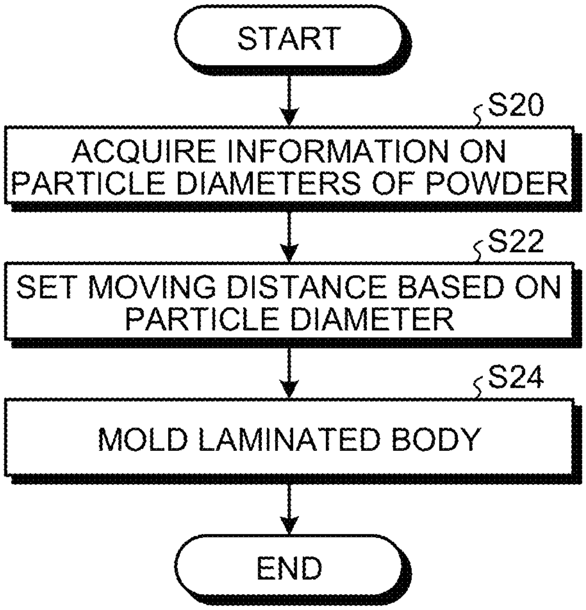
FIG. 8 is a flowchart explaining the procedure of molding a laminated body according to the present embodiment.

Next, the procedure of molding the laminated body L according to the present embodiment is described. FIG. 8 is a flowchart explaining the procedure of molding a laminated body according to the present embodiment. As illustrated in FIG. 8, at the start, for example, the controller 20 acquires, by means of the powder control unit 40, information on particle diameters of the powder P that is to be fed (step S10), and sets the moving distance H based on the acquired information on particle diameters of the powder P by means of the movement control unit 44 (step S12; a moving distance setting step). For example, the powder control unit 40 acquires the information on particle diameters of the powder P stored in the powder feeding unit 12. The information on particle diameters of the powder P is information indicating the value of a particle diameter of the powder P, and is, for example, the value of the maximum particle diameter Dmax. The powder control unit 40 may acquire the information on particle diameters of the powder P, for example, through input of a user or may acquire the result of measurement of particle diameters of the powder P by operating a particle size distribution measuring device, which is not illustrated. The movement control unit 44 acquires the information on particle diameters of the powder P that has been acquired by the powder control unit 40 and sets the moving distance H so that the proportion thereof to a particle diameter of the powder P can be a preset proportion. For example, the movement control unit 44 sets the moving distance H so that the moving distance H can be not less than 50% and not more than 100% of the maximum particle diameter Dmax of the powder P. Alternatively, the movement control unit 44 may acquire the value of the proportion X of the height HA to the height HS and set the moving distance H so that the value thereof can be not less than a value obtained by multiplying the maximum particle diameter Dmax by the proportion X. Here, step S10 and step S12 are not limited to being implemented by the controller 20 and may be executed by the user. In this case, the user determines the moving distance H so that the proportion thereof to a particle diameter of the powder P can be a preset proportion and sets the moving distance H by inputting a value thus determined of the moving distance H to the controller 20.

After the moving distance H is set, the controller 20 molds the laminated body (step S24; a molding step). The controller 20, each time after moving the stage 32 downward by the moving distance H by means of the movement control unit 44, feeds the powder P onto the stage 32 by means of the powder control unit 40 and irradiates the powder P with the beam B, thereby stacking the solidified bodies A in layers one by one to mold the laminated body L. The present procedure thereby ends.

While the moving distance H is described above as being set based on a particle diameter of the powder P in the present embodiment, the powder P to be used may be selected based on the moving distance H that has been preset. That is, in the present embodiment, the powder P that has a particle diameter the proportion of which to the moving distance H of the stage 32 equals to a preset proportion may be prepared and used for molding the laminated body L. The relation between the moving distance H and the particle diameter of the powder P in this case is the same as the relation therebetween in a case where the moving distance H is set based on a particle diameter of the powder P. For example, as the powder P to be used, the powder P the maximum particle diameter Dmax of which is not more than 200% of (not more than twice) the moving distance H may be selected based on a modification of Expression (3) given above may be selected. Alternatively, as the powder P to be used, the powder P the maximum particle diameter Dmax of which is a value obtained by dividing the moving distance H by the proportion X may be selected based on a modification of Expression (6) given above. Further alternatively, the powder P the maximum particle diameter Dmax of which is not less than 100% of (not less than one time) the moving distance H may be selected as the powder P to be used.

Figure 9:
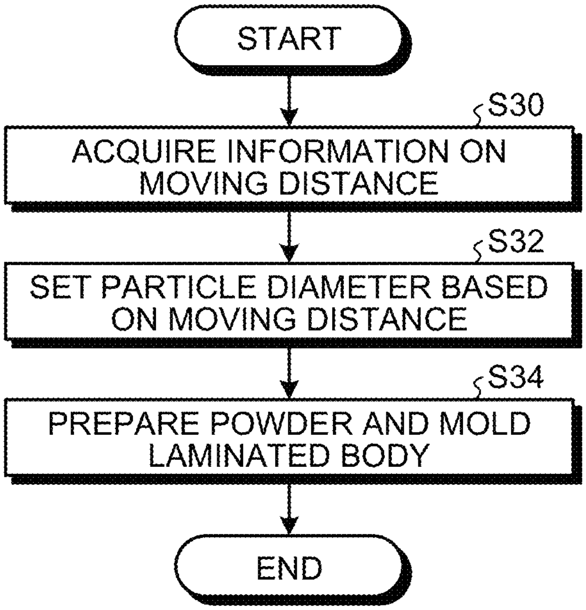
FIG. 9 is a flowchart explaining the procedure of molding a laminated body according to another example of the present embodiment.

FIG. 9 is a flowchart explaining the procedure of molding a laminated body according to another example of the present embodiment. FIG. 9 illustrates the procedure of molding the laminated body L in a case where the powder P to be used is selected based on the moving distance H. As illustrated in FIG. 9, the controller 20 acquires information on the preset moving distance H, for example, by means of the movement control unit 44 (step S30) at the start; and, by means of the powder control unit 40, the controller 20 sets, based on the acquired information on the moving distance H, particle diameters of the powder P to be used and prepares the powder P that has the set particle diameters (step S32; a powder preparing step). For example, the powder control unit 40 calculates a particle diameter that is a certain proportion of the moving distance H. The powder control unit 40 then, for example, notifies the user of information on the calculated particle diameter to prompt the user to feed the powder P that has the particle diameter thus calculated, thereby causing the powder feeding unit 12 to feed the powder P that has the calculated particle diameter. Here, step S30 and step S32 are not limited to being implemented by the controller 20 and may be executed by the user. In that case, the user acquires the information on the preset moving distance H, calculates a particle diameter that is the certain proportion of the moving distance H, prepares the powder P that has the calculated particle diameters, and causes the powder feeding unit 12 to feed the prepared powder P.

Thereafter, the controller 20 molds the laminated body L (step S34; a molding step). The controller 20, each time after moving the stage 32 downward by the moving distance H by means of the movement control unit 44, feeds the powder P onto the stage 32 by means of the powder control unit 40 and irradiates the powder P with the beam B, thereby stacking the solidified bodies A in layers one by one to mold the laminated body L. The present procedure thereby ends.

Thus, the moving distance H may be set based on a particle diameter of the powder P in the present embodiment, or the powder P to be used may be selected based on the moving distance H that has been preset. That is, it can be understood that, in the present embodiment, the laminated body L is molded under conditions that enables the moving distance H to be a certain proportion of a particle diameter of the powder P.

As described above, the laminated body molding method according to the present embodiment is a method for molding the laminated body L by irradiating the powder P fed onto the stage 32 with the beam B and thereby fusing and solidifying the powder P or sintering the powder P, and includes a moving distance setting step and a molding step. At the moving distance setting step, the moving distance H of the stage 32 is set to a length that is a certain proportion of a particle diameter of the powder P. At the molding step, a process of moving the stage 32 downward by the moving distance H, feeding the powder P onto the stage 32, and irradiating the fed powder P with the beam B to fuse and solidify the powder P or sinter the powder P is repeated, whereby the laminated body L is molded. This laminated body molding method may be executed by the laminated body molding apparatus 1, for which the controller 20 that serves as a moving distance setting unit and a molding unit executing the moving distance setting step and the molding step.

In the laminated body molding method according to the present embodiment, the moving distance H is set to a length that is the certain proportion of a particle diameter of the powder P, that is, the moving distance H is set based on a particle diameter of the powder P, whereby a manufacturing method for preventing impairment of capabilities of the laminated body can be constructed. Therefore, with this laminated body molding method, impairment of capabilities of the laminated body L can be prevented.

The laminated body molding method further includes a proportion acquiring step of acquiring information on the proportion X of the volume of a solidified body A to the apparent volume of the powder P fed onto the stage 32, the solidified body A being solidified as a result of irradiating the powder P with the beam B. The moving distance H is then set based on the proportion X at the moving distance setting step. In this laminated body, molding method, the moving distance H is set based on the proportion X, whereby impairment of capabilities of the laminated body L can be prevented.

At the moving distance setting step, the moving distance H is set to a length that is not less than 50% and not mere than 100% of the maximum particle diameter Dmax of the powder P. In this laminated body molding method, the moving distance H is set not less than 50% and not more than 100% of the maximum particle diameter Dmax of the powder P, whereby, while a decrease in cooling speed is prevented because formation of gaps in the powder layer S is prevented, reduction in shaping accuracy can be prevented. Therefore, with this laminated body molding method, impairment of capabilities of the laminated body L can be prevented.

Alternatively, the laminated body molding method according to the present embodiment is a method for molding the laminated body L by irradiating the powder P fed onto the stage 32 with the beam B and thereby fusing and solidifying the powder P or sintering the powder P, and includes a powder preparing step and a molding step. At the powder preparing step, the powder P that has a particle diameter that is a certain proportion of the moving distance H of the stage 32 is prepared. At the molding step, a process of moving the stage 32 downward by the moving distance H, feeding the prepared powder P onto the stage 32, and irradiating the fed powder P with the beam B fuse and solidify the powder P or sinter the powder P is repeated, whereby the laminated body SL is molded. This laminated body molding method may be executed by the laminated body molding apparatus 1, for which the controller 20 that serves as a moving distance setting unit and a molding unit executes the powder preparing step and the molding step.

In this laminated body molding method, the laminated body L is molded using the powder P that has a particle diameter that is the certain proportion of the moving distance H, that is, the powder P is selected based on the moving distance H, whereby a manufacturing method for preventing impairment of capabilities of the laminated body L can be constructed. Therefore, with this laminated body molding method, impairment of capabilities of the laminated body L can be prevented.

The laminated body molding method further includes a proportion acquiring step of acquiring information on the proportion X or the volume of a solidified body A to the apparent volume of the powder P fed onto the stage 32, the solidified body A being solidified as a result of irradiating the powder P with the beam B. The powder P is then prepared based on the proportion X at the powder preparing step. In this laminated body molding method, the powder P is selected based on the proportion X, impairment of capabilities of the laminated body L can be prevented.

At the powder preparing step, the powder P the maximum particle diameter Dmax of which is not more than twice the moving distance H is prepared. In this laminated body molding method, the maximum particle diameter Dmax is set not less than one time and not more than twice the moving distance H, whereby, while a decrease in cooling speed is prevented because formation of Gaps in the powder layer S is prevented, reduction in shaping accuracy can be prevented. Therefore, with this laminated body molding method, impairment of capabilities of the laminated body L can be prevented.

Example

Next, an example of the present embodiment is described. For the present example, a laminated body molding apparatus manufactured by ARCM, which employs the electron beam melting (EBM) technique, was used to mold a laminated body with the moving distance H set to 50 μm. As the present example, the laminated body was molded using powder obtained by applying gas atomization to and thereby powdering a nickel based alloy called Inconel 718. As to the maximum particle diameter of the powder in the present example, the particle size distribution was measured using the laser diffraction and scattering method, and the maximum particle diameter was found to be approximately 100 μm. As a comparable example, a laminated body was molded using powder found to have the maximum particle diameter of approximately 150 μm as a result of measuring the particle size distribution using the laser diffraction and scattering method. In the comparable example, conditions other than the particle diameter are the same as in the present example.

Figure 10:
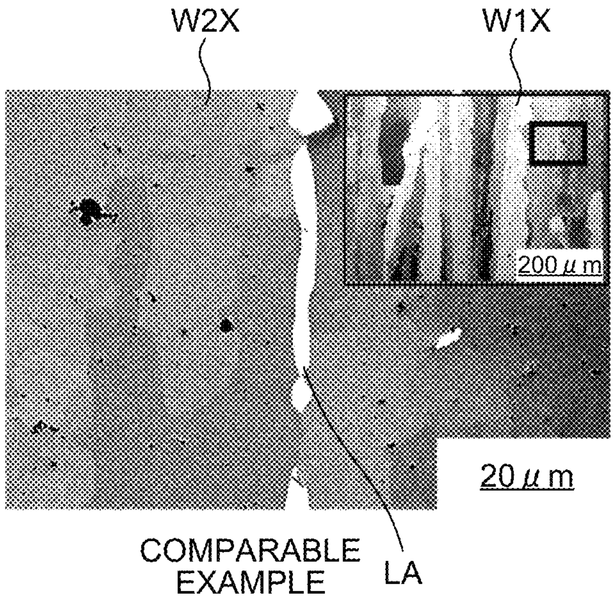
FIG. 10 is a view illustrating images captured of the microstructure of a laminated body according to a comparable example.
Figure 11:
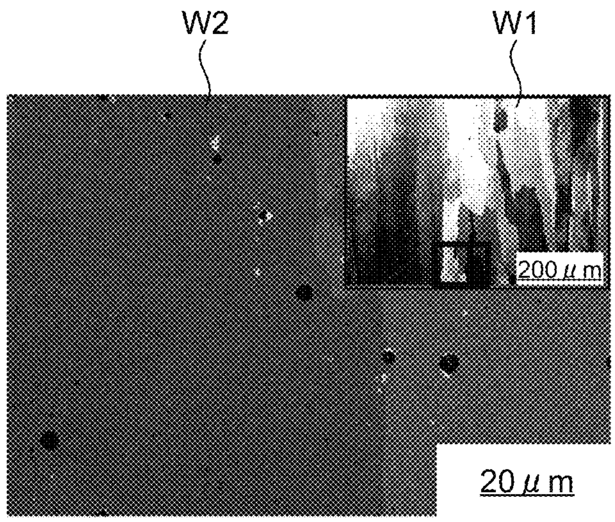
FIG. 11 is a view illustrating images captured of the microstructure of a laminated body according to the present example.

FIG. 10 is a view illustrating images captured of the microstructure of a laminated body according to a comparable example. FIG. 11 is a view illustrating images captured of the microstructure of a laminated body according to the present example. The image W1X in the upper right corner in FIG. 10 is an image of the microstructure of the laminated body according to the comparable example; and the photograph W2X is an image obtained by enlarging a location surrounded by a rectangular frame in the image W1X. The image W1 in the upper right corner in FIG. 11 is an image of the microstructure of the laminated body according to the present example; and the photograph W2 is an image obtained by enlarging a location surrounded by a rectangular frame in the image W1. As illustrated in FIG. 10, the laminated body according to the comparable example is found to have a location LA in which a Laves structure was deposited. In contrast, as illustrated in FIG. 11, the laminated body according to the present example is found to have no Laves phases deposited. Thus, it is found that, according to the present example, the Laves phase is prevented from being deposited because the moving distance H is set not less than 50% of the maximum particle diameter of the powder, whereby impairment of capabilities can be prevented.

While an embodiment of the present invention is described above, the described specifications of this embodiment are not intended to limit embodiments. The constituent elements described above include those easily conceivable by the skilled person, those substantially identical to each other, and those that fall within what is called the range of equivalents. The constituent elements described above can be combined as appropriate. Furthermore, various omissions, replacements, or changes of the constituent elements can be made without departing from the gist of the embodiment described above.

REFERENCE SIGNS LIST

1 LAMINATED BODY MOLDING APPARATUS
10 MOLDING CHAMBER
12 POWDER FEEDING UNIT
14 BLADE
16 RADIATION SOURCE UNIT
18 RADIATION UNIT
20 CONTROLLER
30 HOUSING
32 STAGE
34 MOVING MECHANISM
A SOLIDIFIED BODY
B BEAM
HA, HS HEIGHT
L LAMINATED BODY
P POWDER
P0 PARTICLE
S POWDER LAYER

The invention claimed is:

1. A laminated body molding method for molding a laminated body by irradiating powder fed onto a stage with a beam and fusing and solidifying the powder or sintering the powder, the laminated body molding method comprising:

a proportion acquiring step of acquiring information on a proportion of a volume of a solidified body to an apparent volume of powder fed onto the stage, the solidified body being solidified as a result of irradiating the powder with the beam;

an information on a maximum particle size of the powder acquiring step;

a moving distance setting step of setting a moving distance of the stage to a length that is a certain proportion of the maximum particle size of the powder which is performed after the proportion acquiring step; and a molding step of molding the laminated body by repeating a process of moving the stage downward by the moving distance, feeding the powder onto the stage thus moved, and irradiating the fed powder with the beam to fuse and solidify the powder or sinter the powder, wherein the moving distance is set by plugging in the acquired information on the maximum particle size of the powder and the information on the proportion into a following formula, and setting the moving distance so as to satisfy the following formula at the moving distance setting step, $$D\text{max} \geq H \geq X \cdot D\text{max}$$

and, H is the moving distance, Dmax is the maximum particle size of the powder, and X is the proportion of the volume of the solidified body to the apparent volume of powder fed onto the stage, the powder is nickel based alloy or a TiAI based alloy, a range of Dmax is 100 μm or more and 150 μm or less, and a range of X is 0.5 or more and 1 or less.

2. A laminated body molding method for molding a laminated body by irradiating powder fed onto a stage with a beam and fusing and solidifying the powder or sintering the powder, the laminated body molding method comprising:

a proportion acquiring step of acquiring information on a proportion of a volume of a solidified body to an apparent volume of powder fed onto the stage, the solidified body being solidified as a result of irradiating the powder with the beam;

a powder preparing step of calculating a maximum particle size that is a certain proportion of a moving distance of the stage, preparing the powder that has the calculated maximum particle size which is performed after the proportion acquiring step; and a molding step of molding the laminated body by repeating a process of moving the stage downward by the moving distance, feeding the powder onto the stage thus moved, and irradiating the fed powder with the beam to fuse and solidify the powder or sinter the powder, in the powder preparation step, the moving distance and the acquired information on the proportion are plugged into a following formula to prepare the powder, that has the maximum particle size of a value obtained by dividing the moving distance that satisfies the following formula by the proportion, $$D\text{max} \geq H \geq X \cdot D\text{max}$$

and, H is the moving distance, Dmax is the maximum particle size of the powder, and X is the proportion of the volume of the solidified body to the apparent volume of powder fed onto the stage, the powder is nickel based alloy or a TiAI based alloy, a range of Dmax is 100 μm or more and 150 μm or less, and a range of X is 0.5 or more and 1 or less.

3. A method of laminated body molding performed by a laminated body molding apparatus configured to mold a laminated body by irradiating powder fed onto a stage with a beam and fusing and solidifying the powder or sintering the powder, the method comprising:

a powder control unit configured to acquire a information on a maximum particle size of the powder;

moving by a moving distance setting unit, a moving distance of the stage to a length that is a certain proportion of a maximum particle size of the powder; and molding, by a molding unit, the laminated body by repeating a process of moving the stage downward by the moving distance, feeding the powder onto the stage thus moved, and irradiating the fed powder with the beam to fuse and solidify the powder or sinter the powder;

wherein the moving distance setting unit first, acquires information on a proportion of a volume of a solidified body to an apparent volume of powder fed onto the stage, the solidified body being solidified as a result of irradiating the powder with the beam; and subsequently, sets the moving distance by plugging in the acquired information on the maximum particle size of the powder and the information on the proportion into a following formula, and setting the moving distance so as to satisfy the following formula, $$D\text{max} \geq H \geq X \cdot D\text{max}$$

and, H is the moving distance, Dmax is the maximum particle size of the powder, and X is the proportion of the volume of the solidified body to the apparent volume of powder fed onto the stage, the powder is nickel based alloy or a TiAI based alloy, a range of Dmax is 100 μm or more and 150 μm or less, and a range of X is 0.5 or more and 1 or less.

4. A method of laminated body molding performed by a laminated body molding apparatus configured to mold a laminated body by irradiating powder fed onto a stage with a beam and fusing and solidifying the powder or sintering the powder, the method comprising:

preparing, by a powder preparing unit, calculate a maximum particle size that is a certain proportion of a moving distance of the stage and prepare the powder that has the calculated maximum particle size; and molding, by a molding unit, the laminated body by repeating a process of moving the stage downward by the moving distance, feeding the powder onto the stage thus moved, and irradiating the fed powder with the beam to fuse and solidify the powder or sinter the powder;

wherein the powder preparing unit first, acquires information on a proportion of a volume of a solidified body to an apparent volume of powder fed onto the stage, the solidified body being solidified as a result of irradiating the powder with the beam;

subsequently, plugs in the moving distance and the acquired information on the proportion into a following formula, and prepares the powder having the maximum particle size of a value obtained by dividing the moving distance that satisfies the following formula by the proportion, $$D\text{max} \geq H \geq X \cdot D\text{max}$$

and, H is the moving distance, Dmax is the maximum particle size of the powder, and X is the proportion of the volume of the solidified body to the apparent volume of powder fed onto the stage, the powder is nickel based alloy or a TiAI based alloy, a range of Dmax is 100 μm or more and 150 μm or less, and a range of X is 0.5 or more and 1 or less.

* * * * *